(12) United States Patent
Sennett et al.

(10) Patent No.: US 8,275,347 B2
(45) Date of Patent: Sep. 25, 2012

(54) EMERGENCY ALERT INITIATION VIA A MOBILE DEVICE

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1033 days.

(21) Appl. No.: 12/059,656

(22) Filed: Mar. 31, 2008

(65) Prior Publication Data

US 2009/0247114 A1 Oct. 1, 2009

(51) Int. Cl.
*H04M 11/04* (2006.01)

(52) U.S. Cl. .................. 455/404.1; 455/404.2; 455/466

(58) Field of Classification Search ............... 455/404.1, 455/404.2, 466
See application file for complete search history.

(56) References Cited

U.S. PATENT DOCUMENTS

| 6,112,075 | A | 8/2000 | Weiser | 455/404.1 |
| 2005/0208925 | A1* | 9/2005 | Panasik et al. | 455/404.1 |
| 2006/0040639 | A1 | 2/2006 | Karl et al. | 455/404.1 |

* cited by examiner

*Primary Examiner* — Dwayne Bost
*Assistant Examiner* — Yungsang Lau
(74) *Attorney, Agent, or Firm* — Woodcock Washburn LLP

(57) ABSTRACT

Systems, methods and computer readable media are disclosed for initiating an emergency alert system alert from a mobile device. In addition to the general system, methods and computer readable medium for such initiating of an emergency alert system alert from a mobile device the process may further implement receiving multiple such emergency alert system alert initiation messages and combining them to determine a more accurate location area of the emergency.

14 Claims, 4 Drawing Sheets

EMERGENCY ALERT INITIATION VIA A MOBILE DEVICE

BACKGROUND OF THE INVENTION

Emergency alerts via the Emergency Alert System (EAS) are initiated from an emergency operations center. A problem with initiating an EAS alert via an emergency operation center is that a delay is introduced between the time of awareness of an emergency event, notifying the emergency operations center, and provision of the EAS alert by the emergency operations center. This delay can be especially problematic if the emergency necessitates immediate evacuation or immediate shelter, such as detonation of a dirty bomb on a college campus or an industrial accident that releases toxic chemicals. This problem of delay may be lessened if an EAS alert may be initiated from the mobile device of the first responder at the scene of the emergency.

SUMMARY OF THE INVENTION

In example embodiments of the present disclosure, a method and system are provided to allow initiating an emergency alert system alert from a mobile device. This may include validating the credentials of the first responder who possesses the mobile device, allowing the first responder to specify an area to receive the emergency alert system alert, and allowing an operator at the emergency operations center to modify the emergency alert system alert before it is broadcast.

The method may include, but does not require, first, a emergency operations center receiving from a first message from a first responder's mobile device. The first message is indicative of a message to be broadcast, and the first message comprises a payload and at least one credential. The emergency operations center then validates each credential of the first message. If validating any credential fails, the first message is rejected. If validating every credential is successful, the emergency operations center sends the payload to at least one broadcast tower on a mobile network.

A system and computer readable medium are also disclosed that perform comparable functions as the method discussed above.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for initiating an emergency alert system alert from a mobile device in accordance with this specification are further described with reference to the accompanying drawings in which.

DETAILED DESCRIPTION OF ILLUSTRATIVE EMBODIMENTS

Figure 1:
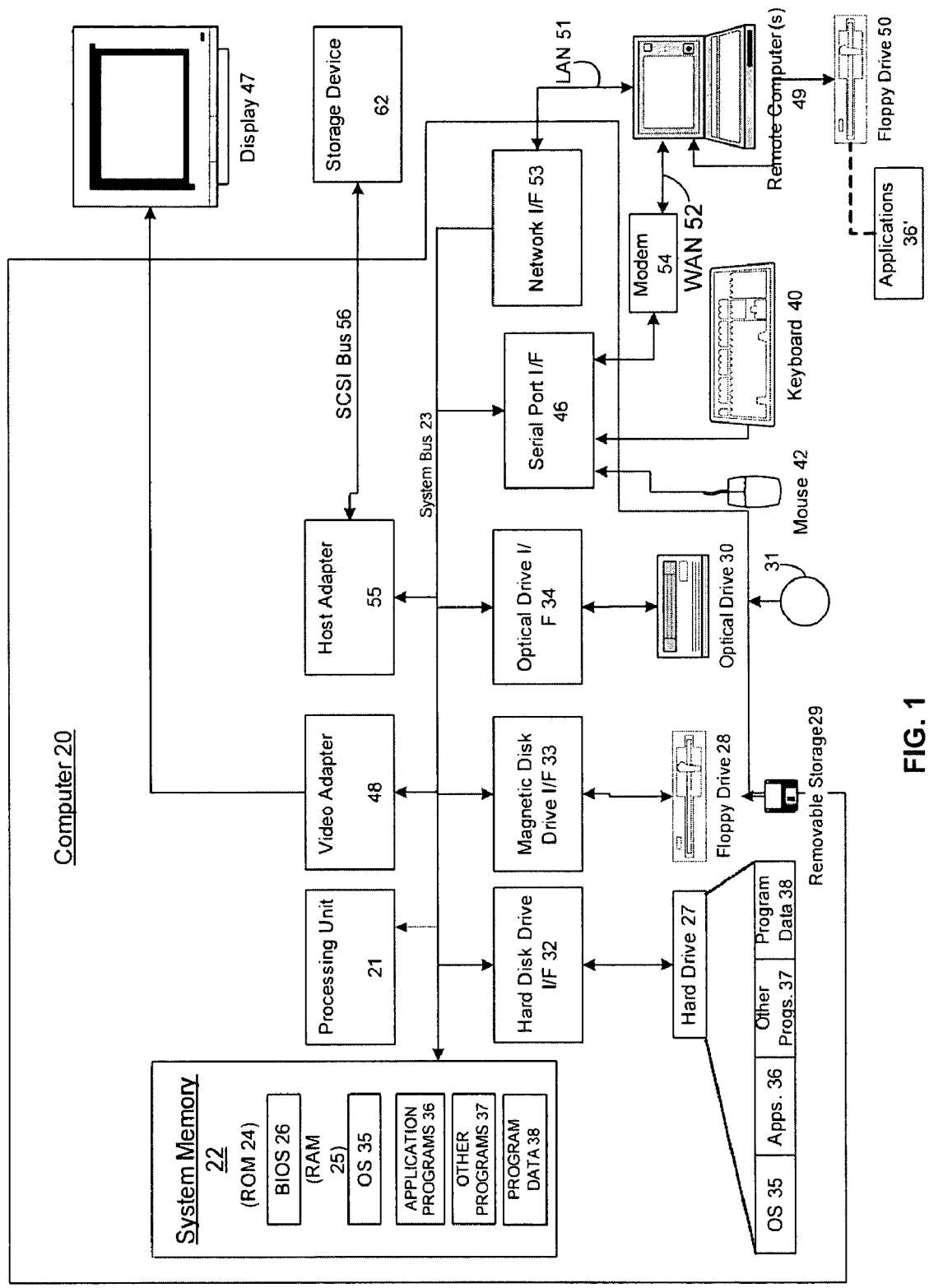
FIG. 1 depicts an example computer system configured effectuate aspects of the present disclosure.
Figure 2:
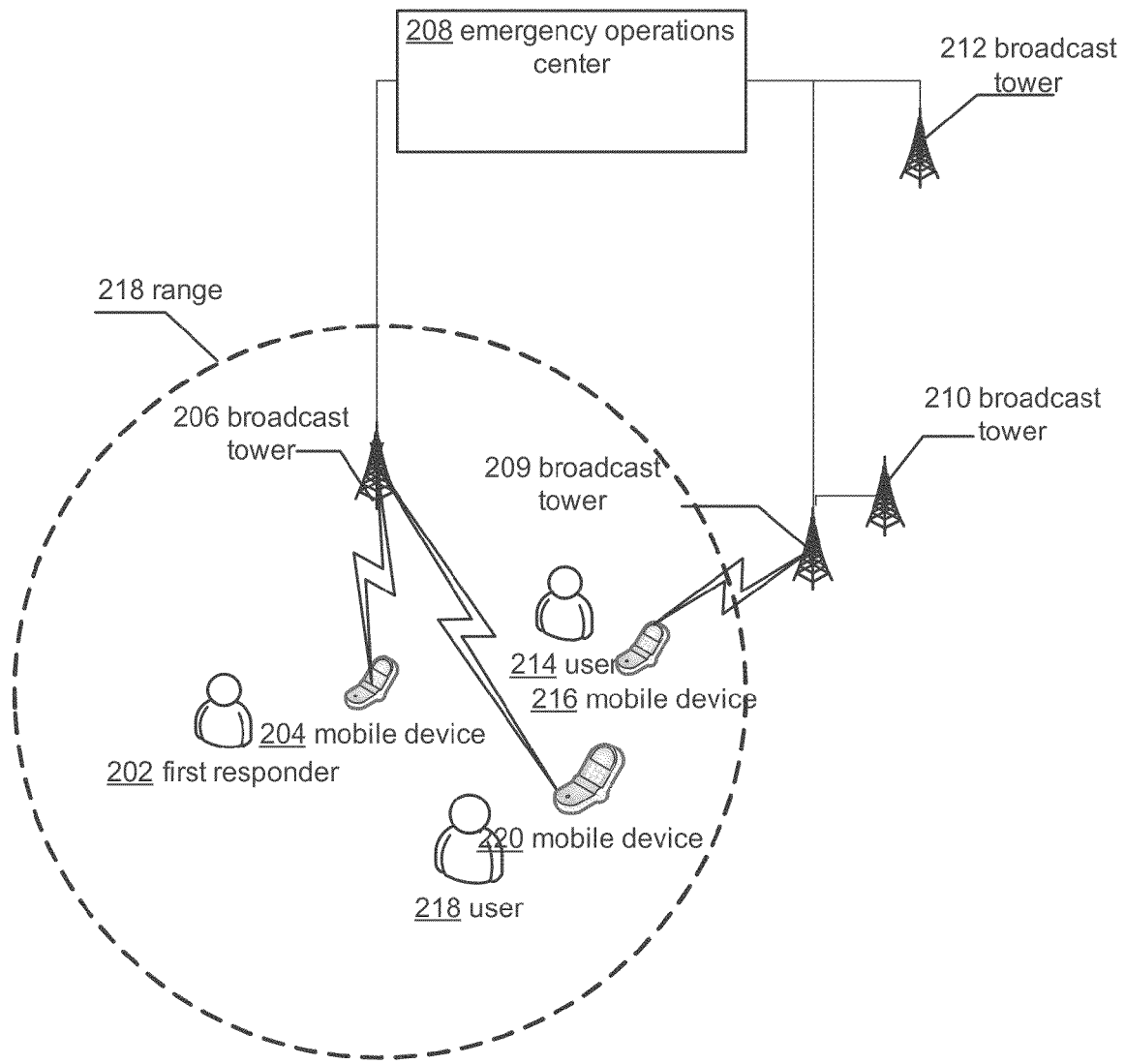
FIG. 2 illustrates an example system for initiating an emergency alert system alert from a mobile device.
Figure 3:
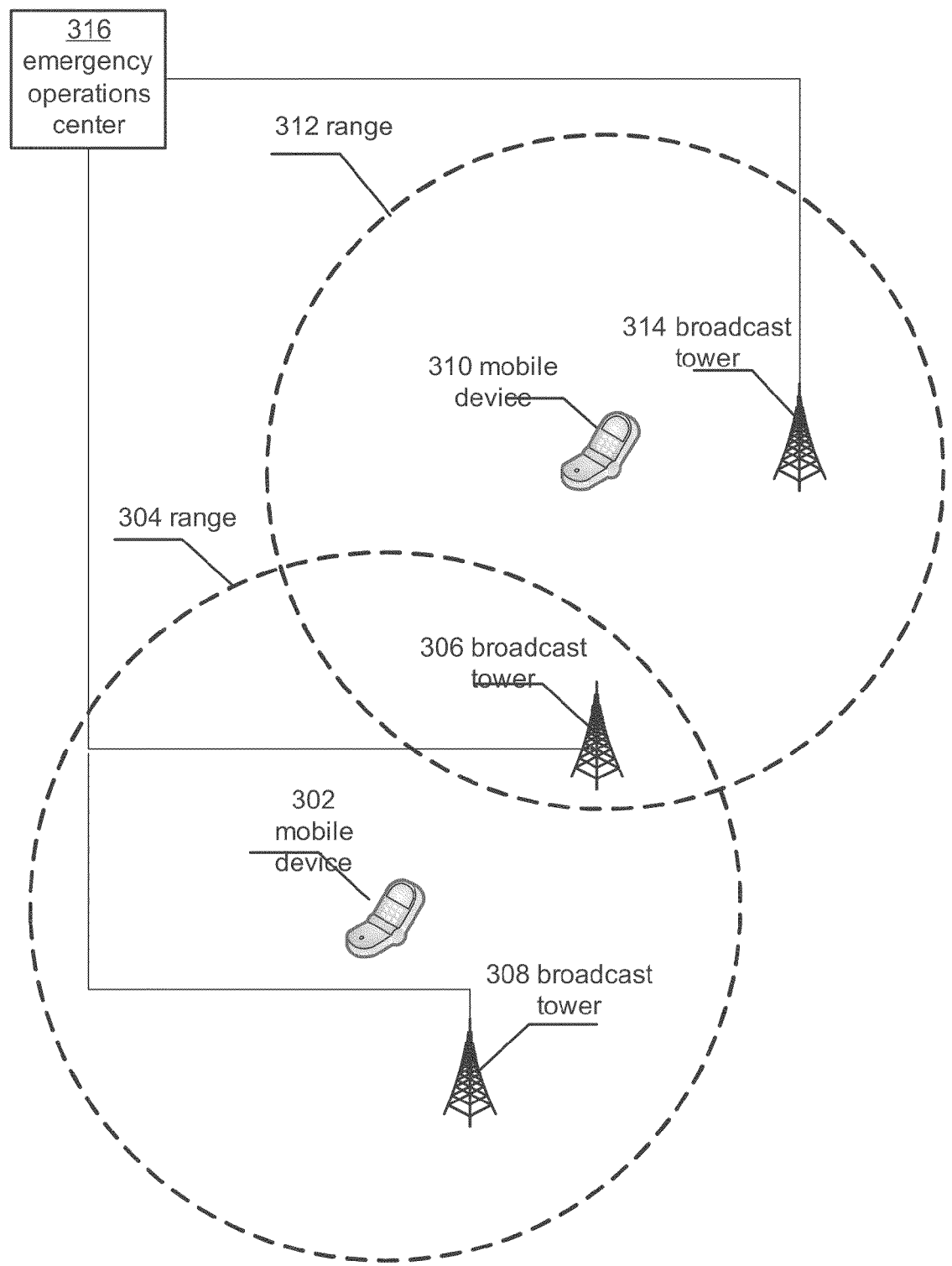
FIG. 3 illustrates an example system for initiating an emergency alert system alert from a mobile device.
Figure 4:
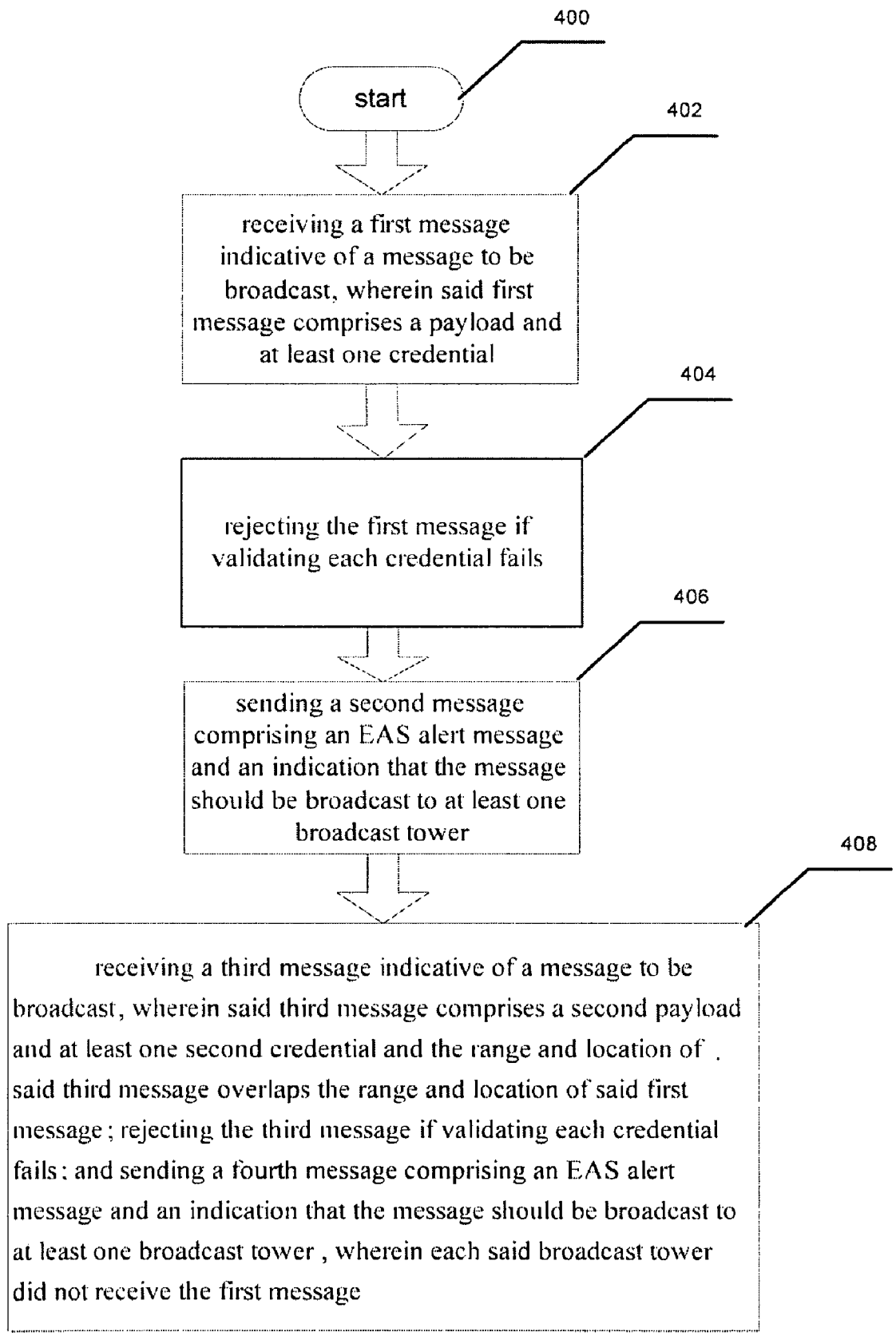
FIG. 4 illustrates an example operational procedure for initiating an emergency alert system alert from a mobile device.

Certain specific details are set forth in the following description and figures to provide a thorough understanding of various embodiments. Those of ordinary skill in the relevant art will understand that they can practice other embodiments without one or more of the details described below. While various methods are described with reference to steps and sequences in the following disclosure, the description as such is for providing a clear implementation of embodiments of the invention, and the steps and sequences of steps should not be taken as required. FIGS. 1-3 illustrate operating environments in which operating procedures may be performed. FIG. 4 depicts example operating procedures.

Numerous embodiments of the present disclosure may execute on a computer. FIG. 1 and the following discussion are intended to provide a brief general description of a suitable computing environment in which the disclosure may be implemented. Although not required, the disclosure will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the disclosure may be practiced with other computer system configurations, including hand held devices, multi processor systems, microprocessor based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device is also connected to the system bus 23 via an interface, such as a video adapter 48. In addition to the display 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

FIG. 2 illustrates a system for initiating an emergency alert system alert from a mobile device. Those skilled in the art will note that the elements are illustrative in purpose and that different implementations can select appropriate elements for such implementations.

The first responder 202 on the scene of an emergency has a mobile device 204. The first responder 202 uses this mobile device 204 to send a message to an emergency operations center 208 indicating that an EAS alert is to be issued. The message may comprise a payload and at least one credential. The first responder may be emergency personnel, such as a fire fighter, a police officer, an emergency medical technician (EMT)—someone who is typically authorized to notify an emergency operations center that an EAS alert should be issued. The mobile device 204 may comprise a computing device that is capable of sending data on a communications network, such as a personal data assistant, a cellular telephone, a computer, and a land-mobile radio. This message may comprise a way of sending a communication across a communications network, such as a text message, a voice message, an instant message, and a multi-media message.

A credential may comprise information that represents that the person using the mobile device 204 is authorized to initiate an EAS alert. It may be suboptimal to allow anyone with access to the mobile device 204 to initiate an EAS alert, since if the first responder 202 were to lose it, then the finder of it could improperly initiate an EAS alert, which would lead to confusion, wasted resources, and a lack of faith in the EAS system. In an embodiment, a credential is a user name and a password. In another embodiment, the mobile device 204 has a biometric reader, and the credential is supplied by the first responder 202 pressing his or her thumb against that reader to verify his or her identity.

In an embodiment, when the first responder 202 arrives on the scene of an emergency, he or she may survey the scene and determine that an EAS alert should be issued for a given area. In an embodiment, the payload of the first message comprises information that specifies that an EAS alert should be issued and the details of that EAS alert. The first responder 202 may enter information as to the location of the emergency into the mobile device 204 as well as an affected range, or radius 218. For instance, where there has been a chemical spill, the affected radius 218 may be the distance from the location for which it is unsafe for humans to be. In another embodiment, the mobile device 204 is able to determine the location using built-in GPS technology or by triangulating its position based on its location relative to three broadcast towers within a range of communication. In another embodiment, the first responder 202 may enter a landmark into the device (such as The Golden Gate Bridge) to specify location, or select a location on a map displayed on the mobile device 204. In an embodiment, rather than specifying a radius 218, the first responder 202 may specify the type of emergency (e.g. small chemical spill, large chemical spill) and the radius 218 may be determined either by the mobile device 204 or the emergency operations center 208. In other embodiments, in lieu of a radius 218, the first responder 202 may specify a neighborhood or elevation (e.g. in case of tsunami, all areas below a certain elevation). Where a radius 218 is specified, this may be something other than a standard unit of distance that conveys equivalent radius 218 information, such as a number of city blocks.

In an embodiment, after the first responder 202 has supplied at least one credential and the information that comprises the payload, the first message is sent and correspondingly received by an emergency operations center 208. This could be effected by the first responder 202 pressing a "send" button on his or her mobile device.

In another embodiment, instead of a human first responder entering information into the mobile device, the mobile device 204 may be coupled with an electronic sensor that monitors its environment for data indicative of an emergency. For example, electronic sensors configured to monitor the air and detect toxic gasses may be placed throughout a city. If one of those sensors detected a toxic gas, such as gaseous formaldehyde, it could communicate with the mobile device to initiate sending a first message as described above.

In the embodiment where the first responder 202 has a mobile device 204 which is a cellular telephone, the mobile device 206 may communicate the message wirelessly with a cellular broadcast tower 206, which then may pass the message along to the emergency operations center 208 via a wired or wireless connection.

Where the emergency operations center 208 receives the message, it then determines whether the corresponding EAS alert should be broadcast, and if so, to what areas. The emergency operations center 208 first validates every credential of the first message. In an embodiment, there is a credential that comprises the first responder's 202 user name, and a credential that comprises the first responder's 202 password. The emergency operations center 208 stores in a database a set of user names and corresponding passwords and validates the credentials of the first message by comparing the received credentials against those stored in the database. If the user name and password of the first message match a user name and corresponding password in the database, then each credential may be validated. In an embodiment where the credential comprises a biometric identification, such as a digital representation of the first responder's 202 thumb print, the emergency operations center 208 may compare that biometric identification against a database of stored biometric identifications and validate the credential if it matches a stored biometric identification.

If the validation is successfully, the emergency operations center 208 then 209, 210, 212. In an embodiment, after the emergency operations center 208 has validated each credential, and determined that the corresponding EAS alert in the payload should be issued, it then determines which broadcast tower or towers 209, 210, 212 that the EAS alert should be sent to. In the embodiment where the first message comprises a location and a radius 218, the emergency operations center 208 determines all such broadcast towers that exist in that area and sends a message to each one. In an embodiment, the second message also comprises information about the emergency, for instance the text string, "There is a dangerous gas leak in the area. Please evacuate immediately."

For example, where the first responder 202 indicates via his or her mobile device 204 that an EAS alert should be issued centered on his or her mobile device 204 with a given range 218, and the message is validated by the emergency operations center 208, the second message is sent to all broadcast towers that communicate in that range 206, 209. Those towers 206, 209 then relay the second message to all mobile devices 204, 216, 220 that they are in communication with towers 206 or 209. In an embodiment, the second message is not sent back to the mobile device 204 that initiated it. The emergency operations center 208 does not send the second message to those broadcast towers 210, 212 that are outside of the area specified.

FIG. 3 illustrates a system for initiating an emergency alert system alert from a mobile device. Those skilled in the art will note that the elements are illustrative in purpose and that different implementations can select appropriate elements for such implementations.

Where an emergency operations center 316 first receives a message from a first mobile device 302 to send an EAS alert to a given area, and then receives a message from a second mobile device 310 to send an EAS alert to an area that overlaps that of the first mobile device, the emergency operations center 316 ensures that each broadcast tower is instructed to broadcast the message only once.

Where a first mobile device 302 sends a message indicative of an EAS alert for an area described by the mobile device's location and range 304 and that message is validated, all broadcast towers 306, 308 within that range 304 are sent the message by the emergency operations center 316.

Later, when the second mobile device 310 sends a similar message indicative of an EAS alert for an area described by the mobile device's location and range 312, that message is validated and the area indicated by the first mobile device's 302 location and range 304 overlaps the second mobile device's 310 location and range 312, the emergency operations center 316 does not immediately send an EAS alert message to all broadcast towers within the area as defined. It first determines which broadcast towers (here, 306) in that area have received an equivalent message already, and sends the message only to the broadcast towers (here, 314) that did not. In this example, the emergency operations center 316 does not send such a message to broadcast tower 306 because it already received a message, or broadcast tower 308 because it is outside of the area specified by the second message.

In an embodiment, a message received by the emergency operations center 316 from a mobile device 302, 310 comprises a time and a type of emergency. The emergency operations center 316 stores this time and type of emergency along with the area covered by the message. When a second message is received it compares the time and type of emergency of the second message against those that are stored in the database. If it is determined that the second message refers to the same emergency (for example, both messages are in regards to a chemical spill and occur within five minutes of each other), then broadcast towers that received the first EAS message will not receive it again. However, where it is determined that the second message refers to a different emergency (for example, both messages are in regards to a chemical spill, but occur two months apart from each other), then all broadcast towers 306, 314 within the area described by the second message receive the EAS alert.

FIG. 4 illustrates a method for initiating an emergency alert system alert from a mobile device. Those skilled in the art will note that operations 400-408 are illustrative in purpose and that different implementations can select appropriate operation(s) for such implementations.

Operation 400 begins the operational process. Operation 400 can be triggered for example in response to a user turning on his or her mobile device.

Operation 402 depicts receiving a first message indicative of a message to be broadcast, wherein said first message comprises a payload and at least one credential. In an embodiment, this may comprise receiving, by an emergency operations center, the first message from the mobile device of a first responder to an emergency scene. The first responder may be emergency personnel, such as a fire fighter, a police officer, an emergency medical technician (EMT)—someone who is typically authorized to notify an emergency operations center that an EAS alert should be issued. The mobile device may comprise a computing device that is capable of sending data on a communications network, such as a personal data assistant, a cellular telephone, a computer, and a land-mobile radio. The first message may comprise a way of sending a communication across a communications network, such as a text message, a voice message, an instant message, and a multi-media message.

A credential may comprise information that represents that the person using the mobile device is authorized to initiate an EAS alert. It may be suboptimal to allow anyone with access to the mobile device to initiate an EAS alert, since if the first responder were to lose it, then the finder of it could improperly initiate an EAS alert, which would lead to confusion, wasted resources, and a lack of faith in the EAS system. In an embodiment, a credential is a user name and a password. In another embodiment, the mobile device has a biometric reader, and the credential is supplied by the first responder pressing his or her thumb against that reader to verify his or her identity.

In an embodiment, when the first responder arrives on the scene of an emergency, he or she may survey the scene and determine that an EAS alert should be issued for a given area. In an embodiment, the payload of the first message comprises information that specifies that an EAS alert should be issued and the details of that EAS alert. The first responder may enter information as to the location of the emergency into the mobile device as well as an affected range, or radius. For instance, where there has been a chemical spill, the affected radius may be the distance from the location for which it is unsafe for humans to be. In another embodiment, the mobile device is able to determine the location using built-in GPS technology or by triangulating its position based on its location relative to three broadcast towers within a range of communication. In another embodiment, the first responder may enter a landmark into the device (such as The Golden Gate Bridge) to specify location, or select a location on a map displayed on the mobile device. In an embodiment, rather than specifying a radius, the first responder may specify the type of emergency (e.g. small chemical spill, large chemical spill) and the radius may be determined either by the mobile device or the emergency operations center. In other embodiments, in lieu of a radius, the first responder may specify a neighborhood or elevation (e.g. in case of tsunami, all areas below a certain elevation). Where a radius is specified, this may be something other than a standard unit of distance that conveys equivalent radius information, such as a number of city blocks.

In an embodiment, after the first responder has supplied at least one credential and the information that comprises the payload, the first message is sent and correspondingly received by an emergency operations center. This could be effected by the first responder pressing a "send" button on his or her mobile device.

In another embodiment, instead of a human first responder entering information into the mobile device, the mobile device may be coupled with an electronic sensor that monitors its environment for data indicative of an emergency. For example, electronic sensors configured to monitor the air and detect toxic gasses may be placed throughout a city. If one of those sensors detected a toxic gas, such as gaseous formaldehyde, it could communicate with the mobile device to initiate sending a first message as described above.

Operation 404 depicts rejecting the first message if validating each credential fails. In an embodiment, there is a credential that comprises the first responder's user name, and a credential that comprises the first responder's password. The emergency operations center stores in a database a set of user names and corresponding passwords and validates the credentials of the first message by comparing the received credentials against those stored in the database. If the user name and password of the first message match a user name and corresponding password in the database, then each credential may be validated. In an embodiment where the credential comprises a biometric identification, such as a digital representation of the first responder's thumb print, the emergency operations center may compare that biometric identification against a database of stored biometric identifications and validate the credential if it matches a stored biometric identification.

Operation 406 depicts In an embodiment, after the emergency operations center has validated each credential, and determined that the corresponding EAS alert in the payload should be issued, it then determines which broadcast tower or towers that the EAS alert should be sent to. In the embodiment where the first message comprises a location and a radius, the emergency operations center determines all such broadcast towers that exist in that area and sends a message to each one. In an embodiment, the second message also comprises information about the emergency, for instance the text string, "There is a dangerous gas leak in the area. Please evacuate immediately."

Optional operation 408 depicts receiving a third message indicative of a message to be broadcast, wherein said third message comprises a second payload and at least one second credential and the range and location of said third message overlaps the range and location of said first message, rejecting the third message if validating each credential fails, and sending a fourth message comprising the second payload and an indication that the message should be broadcast to at least one broadcast tower, wherein each said broadcast tower did not receive the first message.

For example, where the emergency comprises a toxic liquid spill, and a first responder has approached the spill from the south and properly initiated an EAS alert for the affected area as he or she can determine it, another first responder may approach the emergency area from the north and determine that a different, but overlapping, area is affected. In such a case, it may be suboptimal to send two EAS alerts to broadcast towers in the overlapping area because a person who receives two alerts for one emergency may become confused or overly-panicked. Therefore, when the emergency operations center receives the third message it compares the geographical area specified by the first message against the geographical area specified by the third message and sends an alert based on the third message only to those broadcast towers that are inside the geographical area specified by the third message, and also outside of the geographical area specified by the first message.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims.

What is claimed:

1. A method comprising:
    receiving, by equipment at an emergency operations center, a first message indicative of an emergency alert broadcast message to be broadcast, wherein said first message comprises a payload, a first location, a first range, and at least one credential;
    rejecting the first message when validating each credential fails; and
    when validating each credential is successful, sending, from equipment at the emergency operations center, a second message comprising the payload and an indication that the emergency alert broadcast message should be broadcast to at least one broadcast tower within the first range of the first location;
    receiving a third message indicative of a second emergency alert broadcast message to be broadcast, wherein said third message comprises a second payload and at least one second credential and the range and location of said third message overlaps the range and location of said first message;
    rejecting the third message if validating each credential fails; and sending a fourth message comprising the second payload and an indication that the second emergency alert broadcast message should be broadcast to at least one broadcast tower, wherein said broadcast tower did not receive the first message.

2. The method of claim 1, wherein the first message further comprises a text message, a voice message, an instant message, and a multi-media message.

3. The method of claim 1, wherein:
the first message is sent from a mobile device; and the mobile device comprises at least one of a personal data assistant, a cellular telephone, a computer, or a land-mobile radio.

4. The method of claim 1, wherein the first message is received from an electronic sensor.

5. The method of claim 1, wherein the message comprises an emergency alert system message.

6. A system comprising:
circuitry, at an emergency operations center, configured to receive a first message indicative of an emergency alert broadcast message to be broadcast, wherein said first message comprises a payload and at least one credential;
circuitry, at the emergency operations center, configured to reject the first message when validating each credential fails; and
circuitry, at the emergency operations center, configured to send, when validating each credential is successful, a second message comprising the payload and an indication that the emergency alert broadcast message should be broadcast to at least one broadcast tower within the first range of the first location;
circuitry configured to receive a third message indicative of a second emergency alert broadcast message to be broadcast, wherein said third message comprises a second payload and at least one second credential and the range and location of said third message overlaps the range and location of said first message;
circuitry configured to reject the third message if validating each credential fails; and
circuitry configured to send a fourth message comprising the second payload and an indication that the second emergency alert broadcast message should be broadcast to at least one broadcast tower, wherein said broadcast tower did not receive the first message.

7. The system of claim 6, wherein a message comprises a time and a type of emergency, further comprising:
circuitry configured to store the time and a corresponding type of emergency of a message;
circuitry configured to compare the time and type of emergency of the third message against each stored time and corresponding type of emergency; and
circuitry configured to send the payload of the third message to each broadcast tower that the payload of the first message was not sent to if the time of the third message is within a given time period of the time of a stored time and the type of emergency of the third message is the same as the type of emergency that corresponds to that stored time.

8. The system of claim 6, wherein the third message comprises an emergency alert system message.

9. The system of claim 6, wherein the first message is received from an electronic sensor.

10. The system of claim 6, wherein:
the first message is sent from a mobile device; and the mobile device comprises at least one of a personal data assistant, a cellular telephone, a computer, or a land-mobile radio.

11. A computer readable storage medium, wherein the computer readable storage medium in not a transient signal, the computer readable storage medium including computer readable instructions comprising:
instructions for receiving, by equipment at an emergency operations center, a first message indicative of an emergency alert broadcast message to be broadcast, wherein said first message comprises a payload and at least one credential;
instructions for rejecting, by equipment at the emergency operations center, the first message when validating each credential fails; and
instructions for sending, by equipment at the emergency operations center, when validating each credential is successful, the payload to at least one broadcast tower within the first range of the first location;
instructions for receiving a third message indicative of a second emergency alert broadcast message to be broadcast, wherein said third message comprises a second payload and at least one second credential and the range and location of said third message overlaps the range and location of said first message;
instructions for rejecting the third message if validating each credential fails; and
instructions for sending a fourth message comprising the second payload and an indication that the second emergency alert broadcast message should be broadcast to at least one broadcast tower, wherein said broadcast tower did not receive the first message.

12. The computer readable storage medium of claim 11, wherein the emergency alert broadcast message comprises an emergency alert system message.

13. The computer readable storage medium of claim 11, wherein the first message is received from an electronic sensor.

14. The computer readable storage medium of claim 11, wherein:
the payload is sent from a mobile device; and the mobile device comprises a personal data assistant, a cellular telephone, a computer, and a land-mobile radio.

* * * * *

UNITED STATES PATENT AND TRADEMARK OFFICE
CERTIFICATE OF CORRECTION

PATENT NO. : 8,275,347 B2
APPLICATION NO. : 12/059656
DATED : September 25, 2012
INVENTOR(S) : DeWayne Allan Sennett et al.

Page 1 of 1

It is certified that error appears in the above-identified patent and that said Letters Patent is hereby corrected as shown below:

In the Claims:

Column 10,
Claim 11, line 15, delete "storage medium in" and insert -- storage medium is --.

Signed and Sealed this
Third Day of September, 2013

Teresa Stanek Rea
*Acting Director of the United States Patent and Trademark Office*